US008917285B2

(12) United States Patent
Lin

(10) Patent No.: US 8,917,285 B2
(45) Date of Patent: Dec. 23, 2014

(54) DISPLAY METHODS FOR HIGH DYNAMIC RANGE IMAGES AND USER INTERFACES FOR THE SAME

(71) Applicant: COREL Corporation, Ottawa, CA (US)

(72) Inventor: Tsung-Wei Lin, Mountain View, CA (US)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 13/742,054

(22) Filed: Jan. 15, 2013

(65) Prior Publication Data

US 2013/0271481 A1  Oct. 17, 2013

Related U.S. Application Data

(63) Continuation of application No. 11/979,503, filed on Nov. 5, 2007, now Pat. No. 8,355,030, which is a continuation-in-part of application No. 11/030,083, filed on Jan. 7, 2005, now abandoned.

(51) Int. Cl.
| | | |
|---|---|---|
| *G09G 5/00* | (2006.01) | |
| *G06T 11/20* | (2006.01) | |
| *G06K 9/00* | (2006.01) | |
| *G06T 5/40* | (2006.01) | |
| *G06T 5/00* | (2006.01) | |

(52) U.S. Cl.
CPC ........ *G09G 5/00* (2013.01); *G06T 2207/20208* (2013.01); *G06T 5/40* (2013.01); *G06T 5/009* (2013.01)
USPC ........... 345/617; 345/440; 345/441; 345/442; 382/168; 382/169

(58) Field of Classification Search
None
See application file for complete search history.

(56) References Cited

U.S. PATENT DOCUMENTS

| | | | |
|---|---|---|---|
| 5,828,793 A | 10/1998 | Mann | |
| 6,014,165 A | 1/2000 | McIntyre et al. | |
| 6,418,245 B1 | 7/2002 | Udagawa | |
| 6,753,876 B2 | 6/2004 | Brooksby et al. | |
| 6,825,884 B1 | 11/2004 | Horiuchi | |
| 6,850,642 B1 * | 2/2005 | Wang | 382/169 |
| 6,879,731 B2 | 4/2005 | Kang et al. | |
| 7,283,654 B2 | 10/2007 | McLain | |
| 8,355,030 B2 | 1/2013 | Lin | |
| 2002/0186224 A1 | 12/2002 | Debevec et al. | |
| 2004/0218830 A1 | 11/2004 | Kang et al. | |
| 2006/0153445 A1 | 7/2006 | Lin | |
| 2006/0192878 A1 | 8/2006 | Miyahara et al. | |
| 2009/0303249 A1 | 12/2009 | Debevec et al. | |

OTHER PUBLICATIONS

Adobe Photoshop 6.0 User Guide; Adobe systems Inc. 2000.*

(Continued)

*Primary Examiner* — Maurice L McDowell, Jr.
*Assistant Examiner* — Donna J Ricks
(74) *Attorney, Agent, or Firm* — Patterson & Sheridan LLP

(57) ABSTRACT

Display methods and interfaces for high dynamic range images. High dynamic range images and corresponding histograms are displayed on a display device. The histogram panel displays low dynamic range and high dynamic range data of the images simultaneously. The low dynamic range and high dynamic range data is brightness level of the image pixels.

10 Claims, 3 Drawing Sheets
(3 of 3 Drawing Sheet(s) Filed in Color)

(56) References Cited

OTHER PUBLICATIONS

Debevec and Malik, "Recovering High Dynamic Range Radiance Maps from Photographs", International Conference on Computer Graphics and Interactive Techniques, Proceedings of the 24th annual conference on Computer graphics and interactive techniques, pp. 369-378, 1997, ISBN: 0-89791-896-7.*

"Gustave LeGray—Photographer" J.Paul Getty Museum Exhibition Jul. 9-Sep. 29, 2002, http://www.getty.edu/art/exhibitions/le_gray/.

G.W. Larson; "Overcoming Gamut and Dynamic Range Limitations in Digital Images",2001, pp. 1-6.

G. Ward; "High Dynamic Range Image Examples", http://www.anyhere.com/gward/hdrenc/pages/originals.html, Dec. 14, 2003.

MediaCybernetics ImagePro—Image Processing Software, http://replay.waybackmachine.org/20040318224259/http://support.mediacy.com/answers/showquestions.asp?faq=35&fldAuto=267, 2005.

R.G. Littlejohn et al., "Generalized Radiance and Measurement", J. Opt. Soc. America A, vol. 12, 1995, pp. 2736-2743.

R.Fisher et al., "Hypermedia Image Processing Reference—Pixel Subtraction", http://homepages,inf.ed.ac.uk/rhf/HIPR2/pixsub.htm, 1997.

"Blender Documentation vol. 1—User Guide", Blender 3D Creation Software, Sep. 2004, http://www.blender.org/documentation/html1/x5524.html.

3D Buzz Discussion Thread, http://www.3dbuzz,com/vbforum/showthread.php?39231-Spotlight-Problems, Jul. 10-13, 2003.

R.Fattal et al., "Gradient Domain High Dynamic Range Compression", ACM Transactions on Graphics, vol. 21, Issue 3, Jul. 2002, pp. 249-256.

G. Qui; "Novel Fast Tone Mapping Operators for High Dynamic Range Images", Feb. 4, 2004, pp. 1-31.

T. Jyrinki; "High Dynamic Range Images", Helsinki University, Telecommunications Software & Multimedia Laboratory, Seminar on Computer Graphics, Jul. 4, 2003, pp. 1-13.

Adobe Photoshp 6.0 User Guide, Adobe Systems, Inc. 2000.

Debevec; Malik; "Recovering High Dynamic Range Radiance Maps from Photographs", International Conference on Computer Graphics and Interactive Techniques, Proceedings of the 24th Annual Conference on Computer Graphics and Interactive Techniques, ISBN: 0-89791-896-7; 1997, pp. 369-378.

Larson, Rushmeier, Piatko; "A Visibility Matching Tone Reproduction Operator for High Dynamic Range Scenes", IEEE Transactions on Visualization and Computer Graphics, Vol. 3 No. 4, Oct.-Dec. 1997, pp. 291-306.

Green; Cebenoyan; "High Dynamic Range Rendering on the GeForce 6800", Oct. 20, 2004; <http://download.nvidia.com/deve.PDF>.

* cited by examiner

DISPLAY METHODS FOR HIGH DYNAMIC RANGE IMAGES AND USER INTERFACES FOR THE SAME

CROSS-REFERENCED TO RELATED APPLICATIONS

This application is a continuation of U.S. patent application Ser. No. 11/979,503, filed Nov. 5, 2007, issued as U.S. Pat. No. 8,355,030, on Jan. 15, 2013, which itself claims priority benefits to U.S. patent application Ser. No. 11/030,083, filed Jan. 7, 2005. Each of the aforementioned related patent applications is herein incorporated by reference in its entirety.

BACKGROUND

The invention relates to image display, and in particular to display methods for high dynamic range image.

The dynamic range of a scene is expressed by the contrast ratio between its brightest and darkest parts. A low dynamic range image (LDR image) can be displayed on a standard display device because of its smaller dynamic range. Due to the range limitations of LDR images, LDR images cannot represent abundant brightness of real scenes properly. Thus, high dynamic range (HDR) images are necessary. A high dynamic range image (HDR image) is typically generated by combining multiple LDR images of the same scene taken with different exposures. High dynamic range images are broadly employed in image processing systems. Rather than being displayed on a standard display device directly, high dynamic range images require a translation from high dynamic range to low dynamic range for display.

Conventionally, an image panel and histogram panel are arranged on a display device, such as a screen, to display images and corresponding histograms. The conventional histogram panel can only display the brightness of low dynamic range data of the image pixels. FIG. 1 is a diagram of an embodiment of a conventional histogram panel. The conventional histogram panel 5 can only display the brightness of low dynamic range data of the image pixels. Thus, if an image processing system processes high dynamic range images, some image parts cannot be displayed by the conventional histogram panel 5 because of the out-of-range brightness.

For example, if an image processing system comprises an image panel and a conventional histogram panel 5 as shown in FIG. 1, an HDR image may be displayed in the image panel and the brightness data of the image pixels is displayed in the corresponding conventional histogram panel 5. When the displayed image is modified, the histogram panel 5 will be difficult to reflect the actual transformed result due to limited input range of histogram panel.

Thus, methods and interfaces for high dynamic range image display are desirable.

SUMMARY

In an exemplary embodiment of display methods for high dynamic range images, high dynamic range images and corresponding histograms are displayed on a display device. The histogram panel displays transformed low dynamic range and high dynamic range data of the images simultaneously. The low dynamic range and high dynamic range data are the brightness level of the image pixels.

DESCRIPTION OF THE DRAWINGS

The patent or application file contains at least one drawing executed in color. Copies of this patent or patent application publication with color drawing(s) will be provided by the office upon request and payment of the necessary fee.

The present invention can be more fully understood by reading the subsequent detailed description and examples with references made to the accompanying drawings, wherein.

DESCRIPTION

Display methods for high dynamic range images are provided. An image and a histogram panel are displayed on a screen. The image is a high dynamic range image and the histogram panel displays low dynamic range and high dynamic range data of the image, expressed as brightness level of the image pixels. The histogram panel displays a two-dimensional histogram, comprising a first axis, such as X-axis, to display brightness, and a second axis, such as Y-axis, to display pixel counts. The histogram panel changes corresponding histogram of the image when the brightness thereof is adjusted.

Figure 1:
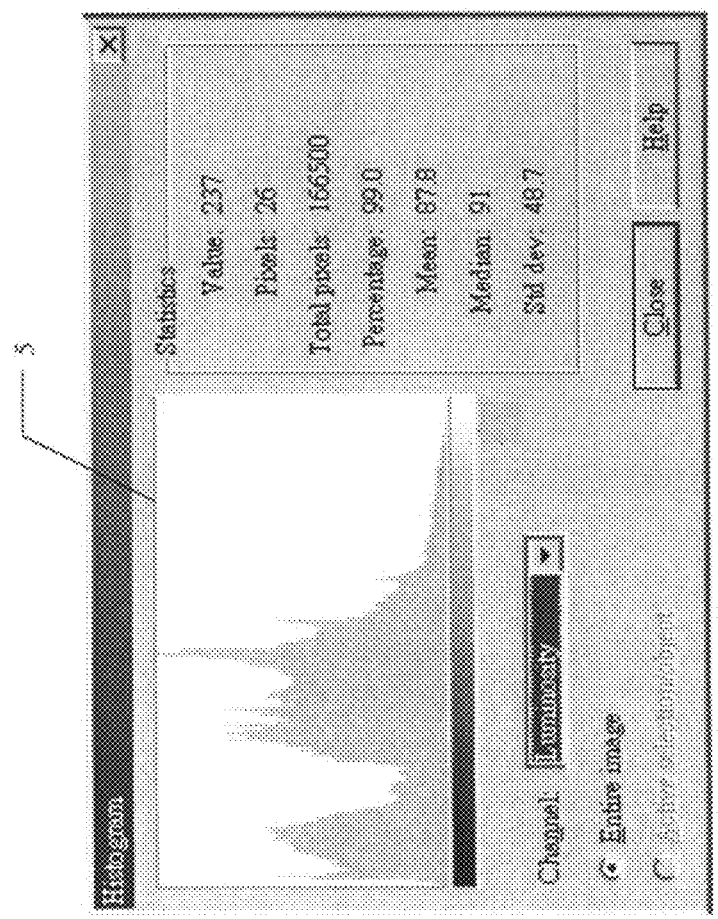
FIG. 1 is a diagram of an embodiment of a conventional histogram panel.
Figure 2:
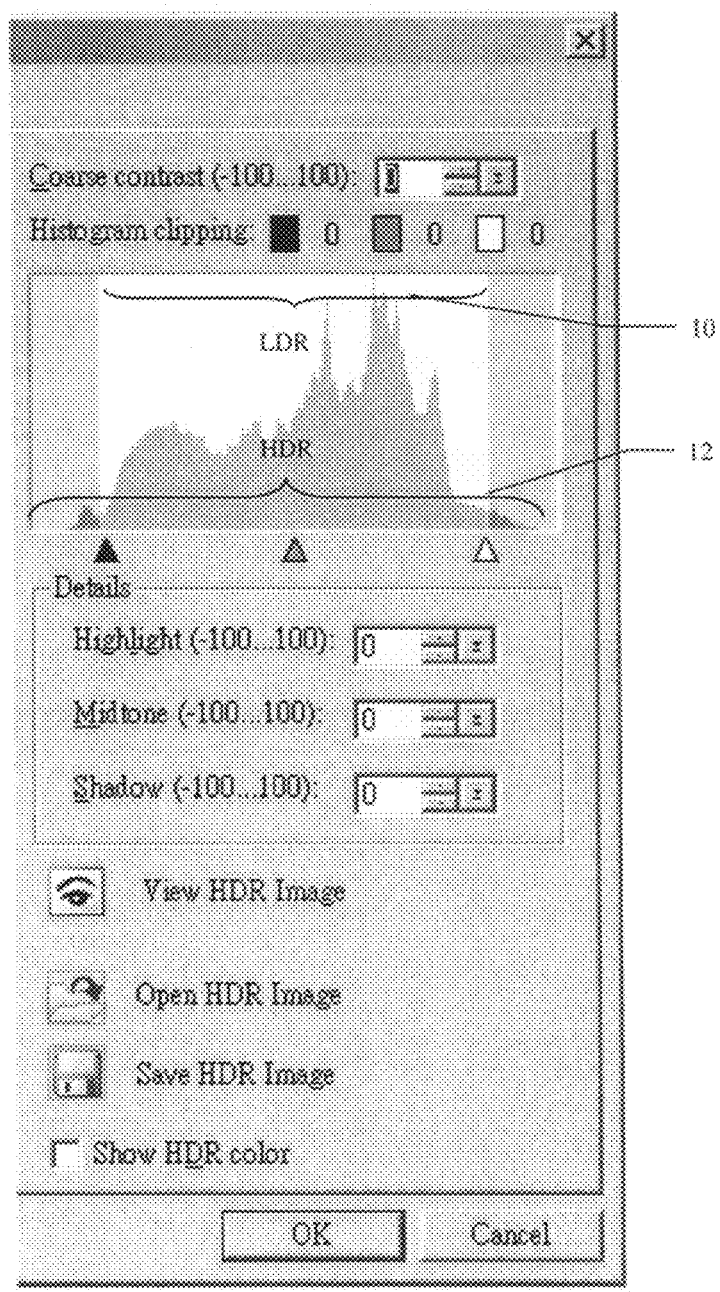
FIG. 2 is a diagram of an embodiment of a histogram panel for high dynamic range images.

FIG. 2 is a diagram of an embodiment of a histogram panel for high dynamic range images. The histogram panel is basically divided into two parts for displaying low dynamic range and high dynamic range data. As shown in FIG. 2, part 10 displays low dynamic range data and part 12 displays high dynamic range data. According to this embodiment, the 'low dynamic range (LDR) data' (part 10) comprises data of pixels specifying brightness ranging from 0~255, and the 'high dynamic range (HDR) data' (part 12) comprises data of pixels specifying brightness lower than 0 and/or higher than 255. When a high dynamic range image is displayed on a screen through a translation, the corresponding histogram is displayed by the histogram panel simultaneously. If the brightness of the image is adjusted, whether partially or entirely, the corresponding histogram changes accordingly. Due to the high dynamic range data display on the screen with the image, users can execute operations or manipulations on the image, such as detailed modifications, according to the high dynamic range data.

Figure 3:
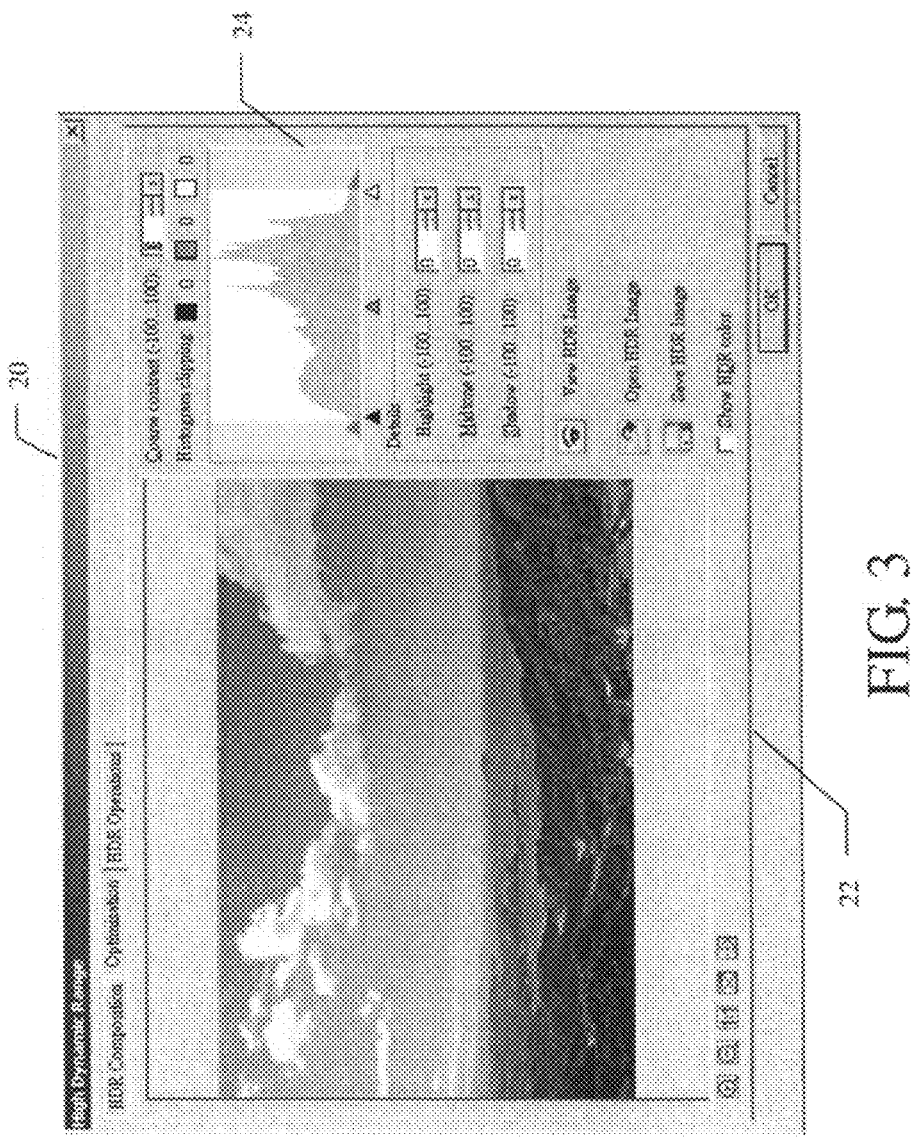
FIG. 3 is a diagram of an embodiment of a user interface for high dynamic range images.

FIG. 3 is a diagram of an embodiment of a user interface for high dynamic range images. The user interface 20 comprises an image panel 22 and a histogram panel 24. The image panel 22 displays a high dynamic range image comprising pixels specifying brightness lower than 0 and/or higher than 255. The histogram panel 24 displays low dynamic range and high dynamic range data of the high dynamic range image, expressed as brightness level of the image pixels. According to this embodiment, the 'low dynamic range (LDR) data' comprises data of pixels specifying brightness ranging from 0~255, and the 'high dynamic range (HDR) data' comprises data of pixels specifying brightness lower than 0 and/or higher than 255. The histogram panel 24 displays a two-dimensional histogram, comprising a first axis to display brightness and a second axis to display pixel counts. In some embodiments, the first axis is X-axis and the second axis is Y-axis. The histogram pane 24 changes when the brightness of the image is adjusted. The user interface 20 is displayed on a display device, such as a screen.

When the brightness of the high dynamic range image displayed on the image panel 22 is adjusted, the histogram displayed on the histogram panel 24 changes accordingly.

The displayed high dynamic range data can be provided for other operations. For example, the user interface can be integrated with an image processing system for producing and processing high dynamic range images.

Thus, display methods and interfaces of high dynamic range images may potentially resolve the inconvenience of conventional high dynamic range image display methods. The disclosed methods are particularly useful for processing system for high dynamic range images.

Methods of the present invention, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the invention. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A display method for high dynamic range images, comprising:
    displaying a high dynamic range image and a histogram panel on a screen, wherein the histogram panel displays low dynamic range data of the image in a center region of the histogram and high dynamic range data of the image in a left and a right region of the histogram, wherein the low dynamic range data presented in the center region of the histogram comprises data of pixels in the image specifying a brightness level ranging from 0 to 255, and the high dynamic range data comprises data of pixels in the image specifying a brightness level lower than 0 and higher than 255 presented in the left and right regions of the histogram, respectively;
    receiving input modifying the brightness of one or more pixels in the high dynamic range image; and
    adjusting the histogram to reflect the modified brightness of the one more pixels.

2. The display method for high dynamic range images as claimed in claim 1, wherein the histogram panel displays a two-dimensional histogram, comprising a first axis to display brightness and a second axis to display pixel counts.

3. A system for presenting a user interface for high dynamic range images, comprising:
    a processor;
    a memory storing one or more applications, which when executed on the processor provide the user interface for high-dynamic range images, wherein the interface includes:
        an image panel, displaying a high dynamic range image; and
        a histogram panel, displaying low dynamic range data of the image in a center region of the histogram panel and high dynamic range data of the image in left and right regions of the histogram panel, wherein the low dynamic range data comprises data of pixels in the image specifying a brightness level ranging from 0 to 255 and the high dynamic range data comprises data of pixels in the image specifying a brightness level either lower than 0 or higher than 255, and wherein data of pixels specifying a brightness level lower than 0 are presented in the left region of the histogram panel and data of pixels specifying a brightness level higher than 255 are presented in the right region of the histogram panel.

4. The user interface for high dynamic range images as claimed in claim 3, wherein the histogram panel displays a two-dimensional histogram, comprising a first axis to display brightness and a second axis to display pixel counts.

5. The user interface for high dynamic range images as claimed in claim 4, wherein the histogram panel changes the histogram of the image when the brightness thereof is adjusted.

6. The user interface for high dynamic range images as claimed in claim 4, wherein the user interface is displayed on a display device.

7. A method comprising:
    retrieving a high dynamic range (HDR) image characterized by a first dynamic range, wherein the HDR image was generated from a plurality of low dynamic range (LDR) images having a second dynamic range, the first dynamic range exceeding the second dynamic range;
    generating, using one or more processors, dynamic range data relating to brightness levels of pixels within the HDR image;
    processing the HDR image to generate a display image in dependence upon at least the second dynamic range; and
    displaying, on a display, the dynamic range data and the display image, wherein the dynamic range data includes a first region presenting data related to the brightness levels of the pixels below that of the second dynamic range, a second region presenting data related to the brightness levels of the pixels within the second dynamic range, and a third region presenting data related to the brightness levels of the pixels above that of the second dynamic range.

8. The method of claim 7, wherein the dynamic range data is presented in a two-dimensional histogram panel with a first axis to display the brightness levels in the first, second, and third regions, and a second axis to display pixel counts.

9. The method of claim 7, further comprising:
    applying a graphic imaging process to the HDR image to generate a modified display image;
    generating modified first dynamic range data relating to the brightness of the pixels in the modified display image; and
    generating updated dynamic range data relating to the brightness of the pixels, relative to the first dynamic range, within the modified display image.

10. The method of claim 9, wherein the updated dynamic range data is presented in the two-dimensional histogram.

* * * * *